United States Patent [19]

Polette

[11] 4,030,461

[45] June 21, 1977

[54] INTERNAL COMBUSTION ENGINE DEVICE

[76] Inventor: Melvin L. Polette, 2223 Wilding Drive, Overland, Mo. 63114

[22] Filed: Apr. 29, 1976

[21] Appl. No.: 681,453

[52] U.S. Cl. .......................................... 123/119 B
[51] Int. Cl.² ...................................... F02M 25/06
[58] Field of Search ...................... 123/119 B, 142

[56] References Cited

UNITED STATES PATENTS

| | | | |
|---|---|---|---|
| 1,220,281 | 3/1917 | Smith | 123/142 |
| 1,461,662 | 7/1923 | Kawamura | 123/142 |
| 3,157,467 | 11/1964 | Daigh et al. | 123/119 B |
| 3,181,833 | 5/1965 | Adams et al. | 123/119 B |
| 3,202,145 | 8/1965 | DePaolo | 123/119 B |
| 3,431,898 | 3/1969 | Driscoll et al. | 123/119 B |
| 3,946,710 | 3/1976 | Albano et al. | 123/119 B |
| 3,958,547 | 5/1976 | Ogawa | 123/142 |
| 3,990,420 | 11/1976 | Bitterman et al. | 123/119 B |

Primary Examiner—Wendell E. Burns
Attorney, Agent, or Firm—Polster and Polster

[57] ABSTRACT

A device inserted in the positive crank case ventilation (PCV) line of an internal combustion engine includes a restricted passageway in the PCV line, and two valve assemblies symmetrically arranged with respect to the restricted passageway. Each valve assembly includes a secondary passageway joining the restricted passageway with a closed valve chamber through a valve seat. A balanced movable valve part in the valve chamber is biased away from the valve seat by a first coil spring in the secondary passageway and is biased toward the valve seat by a second coil spring in the valve chamber. The valve chamber is frusto-conical and tapers inwardly away from the valve seat. The valve member is convex at both its ends and thus forms a restriction with the valve seat at one extreme of its travel, and a restriction with the wall of the valve chamber at the other extreme of is travel. The device increases gasoline mileage and power, and reduces undesirable gaseous emissions.

9 Claims, 7 Drawing Figures

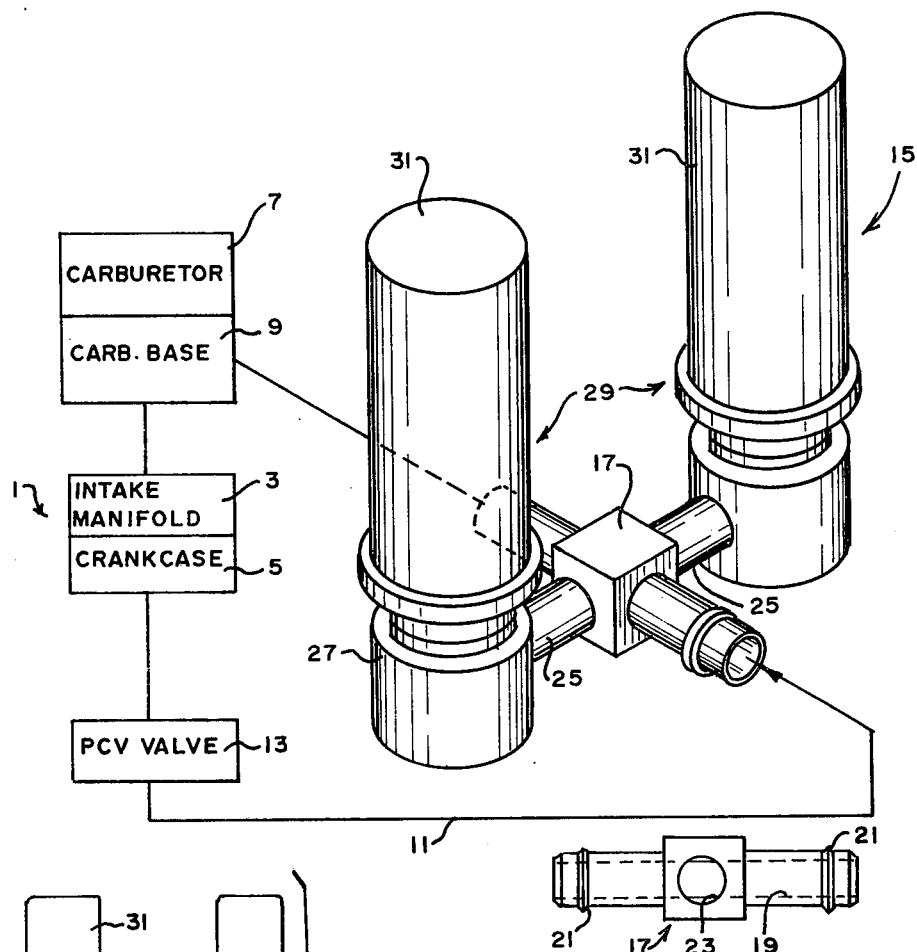
FIG. 1.
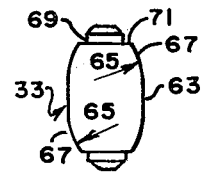
FIG. 7.
FIG. 3.
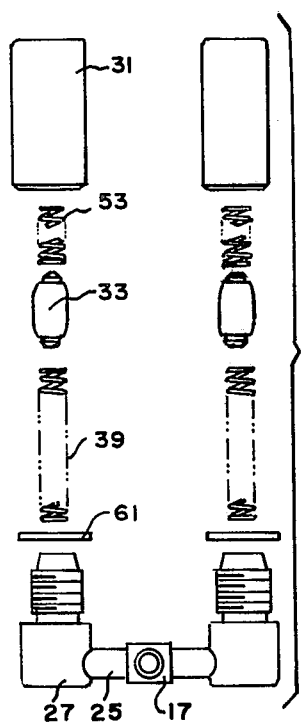
FIG. 2.
FIG. 4.
FIG. 5.
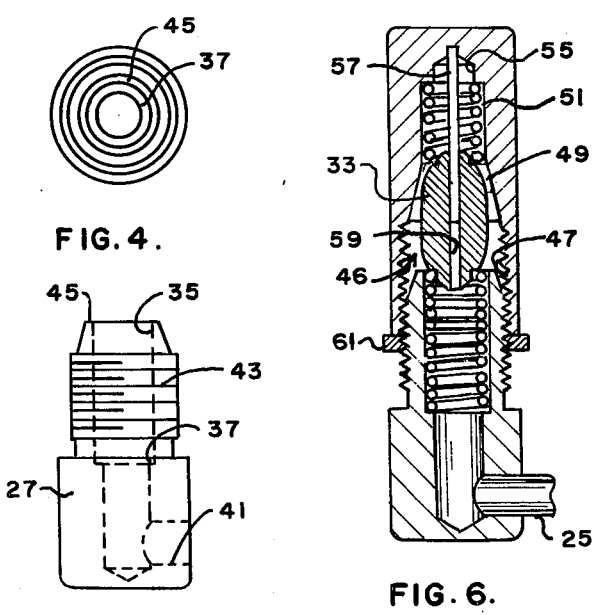
FIG. 6.

INTERNAL COMBUSTION ENGINE DEVICE

BACKGROUND OF THE INVENTION

This invention relates to internal combustion engines, and in particular to a device for increasing the power and gasoline mileage of an internal combustion engine, while reducing emissions of harmful substances, such as carbon monoxide and uncombusted hydrocarbons, caused by incomplete combustion of gasoline.

The need for making internal combustion engines more highly efficient has long been obvious. The need for reducing toxic emissions, such as carbon monoxide, oxides of nitrogen and hydrocarbons has now also been widely recognized.

One of the early suggestions for increasing engine efficiency was to add a "secondary carburetor" to vary the relative amount of air admitted to the engine intake manifold in accordance with the manifold vacuum. An example of such a system is shown in U.S. Pat. No. 3,039,449 (1962), to Mokrzycki. The system described therein is designed to increase air flow into the intake manifold as its vacuum becomes greater.

In recent years, positive crankcase ventilation (PCV) systems have regularly been installed on automobiles in the United States. In these systems, engine crankcase fumes are carried by a line to the intake manifold (either directly or through the base of the carburetor), rather than being vented to the atmosphere. The conduit includes a valve (PCV valve) which is intended to regulate the flow of fume-laden air to the engine intake manifold in such a way as to provide good engine performance under varying conditions of engine speed and load. The PCV valve typically is spring biased open and becomes increasingly restricted in response to increasing pressure differential across it. The PCV valve is generally located at or near the crankcase. Examples of PCV systems are shown, for example, in Pittsley, U.S. Pat. No. 3,359,960 (1967), in Sweeney, U.S. Pat. No. 3,664,368 (1972), and in Billiet, Automotive Engines—Maintenance and Repair (4th ed. 1973), at pages 280–288.

Because the PCV line offers ready access to the manifold, it has been widely used as a point of attachment for secondary carburetors. A commercial version of the Mokrzycki device was attached by cutting into the PCV line rather than into a vacuum-powered windshield wiper motor line as shown in that patent. Other systems, such as those shown in Winton, U.S. Pat. No. 3,809,035 (1974) and Dabrio, U.S. Pat. No. 3,923,024 (1975) have also been attached in the PCV line. These systems decrease auxiliary air flow as intake manifold vacuum increases.

Neither the PCV systems nor the secondary carburetor systems have been entirely successful in attaining their aims.

SUMMARY OF THE INVENTION

One of the objects of this invention is to provide a simple device which, placed in a PCV line, significantly increases gasoline mileage of internal combustion engines.

Another object is to provide such a device which substantially reduces emissions of noxious gases, such as carbon monoxide and unburned hydrocarbons.

Another object is to provide such a device which increases engine horsepower and smooths the operation of the engine.

Another object is to provide such a device which reduces engine temperature and wear.

Other objects will become apparent in light of the following description and accompanying drawings.

In accordance with the present invention, it has been found that the efficiency of an internal combustion engine may be substantially increased by inserting into the PCV line a device which includes a balanced movable valve means for variably restricting communication between a restriction connected in series in the PCV line and a closed valve chamber. The device may be similar in form to the "secondary carburetors" of the prior art, but differs radically from them in that the only air drawn into the body of the device is from the PCV line itself. In accordance with the preferred embodiment of the present invention, the device includes two valve assemblies symmetrically arranged with respect to a restricted passageway in the PCV line. Each valve assembly includes a secondary passageway joining the restricted passageway with a closed valve chamber through a valve seat. A balanced movable valve part in the valve chamber is biased away from the valve seat by a first coil spring and is biased toward the valve seat by a second coil spring in the valve chamber. The first coil spring is preferably in the secondary passageway itself and prevents the movable valve member from seating completely in the valve seat. Preferably, the valve chamber is frustoconical and tapers inwardly away from the valve seat. The valve member includes two convex surfaces which form a restriction with the valve seat at one extreme of the valve member's travel, and a restriction with the frusto-conical wall of the valve chamber at the other extreme of its travel. Each valve assembly preferably includes a body part including the secondary passageway and the valve seat. The body part is externally threaded to receive the internal threads of a valve chamber part. The valve assemblies are adjusted by assembling the valve chamber part and the body part with the movable valve part and balance springs contained within. The valve chamber part is screwed down until both springs are completely compressed, with the valve member slightly spaced from the valve seat at one of its ends and from the frusto-conical wall of the valve chamber at its other end. The valve chamber part is then backed off axially about one-sixteenth inch to provide limited movement for the valve member. Preferably, the movable valve member is slidably mounted on a guide rod. The dimensions, shape, and mass of the movable valve member, and the size and spring rates of the balance springs are carefully chosen to provide movement of the movable valve member in a desired manner to provide the increased engine efficiency and performance of the present invention.

Other aspects of the invention will be better understood in light of the following description of the preferred embodiment.

BRIEF DESCRIPTION OF THE DRAWINGS

In the drawings,

FIG. 1 is a view in perspective of the preferred embodiment of device of this invention, showing schematically its connection in an automobile internal combustion engine system;

FIG. 2 is an exploded view in front elevation of the device shown in FIG. 1;

FIG. 3 is a view in side elevation of a fitting part of the device of FIGS. 1 and 2;

FIG. 4 is a top plan view of a body part of the device of FIGS. 1 and 2;

FIG. 5 is a view in side elevation of the body part of FIG. 4;

FIG. 6 is a fragmentary view in partial axial cross section of a valve assembly part of the device of FIGS. 1 and 2; and FIG. 7 is a view in elevation of a valve member used in the device.

DESCRIPTION OF THE PREFERRED EMBODIMENT

Referring now to the drawings, reference numeral 1 indicates an internal combustion engine having an intake manifold 3 and a crankcase 5. Air and gasoline are metered into the intake manifold through a carburetor 7 having a base 9. Blow-by gases and other fumes in the crankcase 5 are delivered from the crankcase 5 to the carburetor base 9 through a PCV line 11, including a PCV valve 13. The PCV line 11 is typically a three-eighths inch (inner diameter) rubber hose. The PCV valve 13 may be of standard design.

The device of the present invention, indicated generally by the numeral 15, is connected into the PCV line 11 between the PCV valve 13 and the carburetor base 9. The device 15 includes a fitting 17, shown particularly in FIGS. 1-3, for forming a restricted passageway 19 in the PCV line 11. The restricted passageway 19 has an inner diameter of one-fourth inch. The fitting 17 may have a length of about two inches. The exterior diameter of the fitting may be slightly smaller than the nominal diameter of the PCV hose 11, but includes a larger diameter annular part 21 at each end to provide airtight seals with the PCV hose 11. The fitting 17 also includes a pair of lateral openings 23 communicating with the restricted passageway 19. The lateral openings 23 may have a diameter of five-sixteenths inch. The fitting 17 may be made of brass.

Into the openings 23 of the fitting 17 are press-fit a pair of brass tubes 25 having internal diameters of one-fourth inch. Each tube 25 has a length of seven-eighths inch. Press-fit to the free end of each tube 25 is an aluminum base 27 of a valve assembly 29. The valve assembly 29 also includes a hollow aluminum valve chamber part 31 and a movable brass valve member 33. Each base part 27 includes an axial bore 35, including a shoulder 37 which seats a lower coil compression spring 39. A transverse bore 41 communicates with the lower end of the axial bore 35 and holds the tube 25. The upper half of the base part 27 is externally threaded, as shown at 43, and the upper end of the base part 27 tapers inwardly toward a valve seat 45.

The valve chamber part 31 of the valve assembly 29 includes an axial bore 46 extending from the lower end of the valve chamber part 31 toward its upper end. The axial bore 46 includes, from bottom to top, a cylindrical internally threaded part 47 adapted to mate with the externally threaded part 43 of the base 27, an upwardly inward sloping frustoconical section 49, a cylindrical spring-retaining section 51 for holding the upper end of a second coil compression spring 53, and a smaller diameter upper section 55. An axial brass rod 57 is mounted in the upper end of the valve chamber defined by the bore 46. The rod 57 has a diameter of one-sixteenth inch, and the movable part 33 includes a central bore 59 for slidably mounting the valve part 33 on the rod 57. The bore 59 has a diameter which exceeds the diameter of the rod 57 by about 0.004 inch, to permit free sliding movement of the valve part 33 on the rod 57.

A lock nut 61 is provided on the externally threaded part 43 of the base 27, to lock the valve chamber part 31 in an adjusted postion, as described hereinafter.

The valve member 33 is in the form of a cylindrical plug 63 with convexly tapered ends 67, giving it somewhat the appearance of a football. The rounded ends 67 are formed on a radius of curvature 65 larger than the radius of the cylindrical section and are formed with a smooth transition between the cylindrical portion 63 and the convex portions 67; that is, in any axial cross-section the radius of curvature is displaced along a line perpendicular to the axis and through the intersection of the convex section 67 and cylindrical section 63. Near the ends of the valve member 33 the convex faces are turned to form small cylindrical portions 69 and shoulders 71.

Two embodiments of the device 15, having differently sized valve assemblies 29, have been built and successfully tested. The dimensions (in inches) of the valve assembly parts of the two embodiments, designated Model A and Model B, are shown in the following table:

|  | Model A | Model B |
|---|---|---|
| Base Part 27: | | |
| Diameter, bore 35 | 0.375 | 0.391 |
| Inner diameter, shoulder 37 | 0.297 | 0.250 |
| Height of upper half | 0.900 | 0.900 |
| Height, bore 35, seat 45 to shoulder 37 | 0.9375 | 0.906 |
| Valve Chamber Part 31: | | |
| Inner diameter, threaded section 47 | 0.625 | .5625 |
| Height, threaded section 47 | 0.625 | .672 |
| Height, frusto-conical section 49 | 0.775 | .734 |
| Diameter, cylindrical section 51 | 0.375 | .391 |
| Height, cylindrical section 51 | 0.255 | — |
| Diameter, cylindrical section 55 | — | .297 |
| Height, cylindrical section 55 | — | .219 |
| Valve Member 33: | | |
| Diameter, cylindrical section 63 | .500 | 0.375 |
| Height, overall | .930 | .938 |
| Height, cylindrical part 63 | .200 | .360 |
| Height, between shoulders 71 | .750 | .750 |
| Diameter, small cylindrical section 69 | .250 | .203 |
| Radius of curvature 65 | .375 | .3125 |
| Lower Spring 39: | | |
| Diameter, spring | 0.360 | 0.360 |
| Height, relaxed | 2.125 | 2.000 |
| Height, compressed | 0.960 | .900 |
| Diameter, piano wire | 0.030 | 0.030 |
| Number of turns | 32 | 30 |
| Upper Spring 53: | | |
| Diameter, spring | 0.360 | 0.360 |
| Height, relaxed | 0.750 | 0.600 |
| Height, compressed | 0.390 | 0.330 |
| Diameter, piano wire | 0.030 | 0.030 |
| Number of turns | 13 | 11 |

The device of the present invention is connected into the PCV hose 11 of an existing automobile by cutting the hose and forcing the cut ends over the annular ribs 21 of the fitting 17. Especially when the embodiment identified as Model B is used with a large engine (for example, an engine having a displacement of 350 cubic inches, or more), one or more identical devices 15 may also be inserted in series in the line 11.

Each valve chamber part 31 is adjusted by running the lock washer 61 down low on the threads 43 of the base 27, assembling the valve 33 and springs 39 and 53, as shown in FIGS. 2 and 6, and screwing the valve chamber part 31 down tight on the base 27. The valve chamber part 31 is then backed off about one turn, thereby raising it about one-sixteenth inch axially. The lock washers 61 are then run up to hold the valve chamber parts 31 in place.

The internal combustion engine is then turned to cooperate with the device 15. The ignition timing is advanced two degrees to three degrees. The carburetor is then adjusted by means of an emissions detector in the exhaust system of the automotive engine system, to minimize emissions of both carbon monoxide and hydrocarbons. It has been found that very low levels of both carbon monoxide and hydrocarbons may be obtained.

With the device 15 and engine 1 adjusted as described, it has been found that engine efficiency and power are substantially increased.

Numerous variations in the device of this invention, within the scope of the appended claims, will appear to those skilled in the art in light of the foregoing disclosure. For example, a pair of brass balls may be substituted for the valve member 33. Again, it is preferred to mount the balls slidably on the pin 57, rather than omitting the pin 57 and using solid balls. A single three-eighths inch ball may also be used; in this case, the dimensions of the Model B valve assemblies are such that the lock nuts 61 may be omitted and the valve chamber parts 31 screwed down tight, while still permitting proper movement of the balls. These variations are merely illustrative.

I claim:

1. In an internal combustion engine system including an air inlet manifold, a carburetor for admitting air to the manifold, a crankcase, a tubular connection from the crankcase to deliver gases from the crankcase to the inlet of the engine, said tubular connection having in it a pollution control valve, the improvement comprising a device connected in the tubular connection between the pollution control valve and the inlet, said device including restriction means connected in series in said tubular connection between said pollution valve and said inlet; a closed valve chamber; passage means between said restriction and said closed valve chamber; and balanced movable valve means for variably restricting said passage means.

2. The improvement of claim 1 wherein said valve chamber and passage means are part of a valve assembly, said chamber means including a frusto-conical wall tapering inwardly away from said passage means, said passage means including a valve seat, and said balanced movable valve means being positioned between said valve seat and said frusto-conical wall.

3. The improvement of claim 2 wherein the valve member includes a first convex surface which restricts fluid communication through said valve seat at one extreme of travel of said valve member, and a second convex surface which restricts fluid communication between said valve member and said frusto-conical wall of the valve chamber at the other extreme of travel of said valve member.

4. The improvement of claim 3 including two substantially identical valve assemblies communicating with said restriction means.

5. The improvement of claim 4 wherein each of said valve assemblies includes first spring means for biasing said valve member away from said valve seat, and second spring means for biasing said valve means toward said valve seat.

6. The improvement of claim 5 wherein said first spring means comprise a coil spring in said passage means and said second spring means comprise a coil spring in said valve chamber.

7. The improvement of claim 4 wherein each of said valve assemblies includes first spring means for biasing said valve member toward said frusto-conical wall and second spring means for biasing said valve member away from said frustoconical wall.

8. The improvement of claim 7 wherein said first spring means comprise a coil spring in said passage means and said second spring means comprise a coil spring in said valve chamber.

9. The improvement of claim 4 wherein the movable valve member is slidably mounted on a guide rod.

* * * * *